United States Patent [19]

Christianson et al.

[11] Patent Number: 4,846,605
[45] Date of Patent: Jul. 11, 1989

[54] PNEUMATIC GRAIN CONVEYOR WITH UNIVERSAL FRAME

[75] Inventors: Roy O. Christianson; Frank W. Christianson, both of Blomkest, Minn.

[73] Assignee: Christianson Systems, Inc., Blomkest, Minn.

[21] Appl. No.: 85,393

[22] Filed: Aug. 12, 1987

[51] Int. Cl.⁴ .................. B60P 1/60; B65G 53/40; B65G 53/60
[52] U.S. Cl. ........................ 406/41; 406/42; 280/789
[58] Field of Search .................. 406/41–44, 406/109, 173, 171; 280/789; D12/101

[56] References Cited

U.S. PATENT DOCUMENTS

| | | | |
|---|---|---|---|
| D. 271,105 | 10/1983 | Christianson et al. | D15/10 |
| 2,230,425 | 2/1941 | Finnegan | 406/109 X |
| 2,622,341 | 12/1952 | Finnegan | 406/109 X |
| 3,129,980 | 4/1964 | Kiesbar et al. | 406/171 X |
| 3,210,127 | 10/1965 | Schaben et al. | 406/109 X |
| 3,219,394 | 11/1965 | Moss et al. | 406/171 |
| 4,105,219 | 8/1978 | Gerson | 280/789 |
| 4,273,351 | 6/1981 | Salamander | 280/789 X |
| 4,433,946 | 2/1984 | Christianson et al. | 406/109 X |
| 4,599,016 | 7/1986 | Medemblik | 406/109 X |
| 4,714,273 | 12/1987 | Kejr | 280/789 |

FOREIGN PATENT DOCUMENTS 384761 11/1973 U.S.S.R. .............. 406/109

*Primary Examiner*—Joseph F. Peters, Jr.
*Assistant Examiner*—James M. Kannofsky
*Attorney, Agent, or Firm*—Merchant, Gould, Smith, Edell, Welter & Schmidt

[57] ABSTRACT

A universal frame (80) which is particularly adapted for use with a pneumatic grain conveyor (10) includes an offset longitudinal tongue (16) and hitch (18) and structural members arranged in interconnected so as to provide a minimal outer periphery which in turn improves versatility and facilitates discharge of the grain into an adjacent trailer or truck.

11 Claims, 2 Drawing Sheets

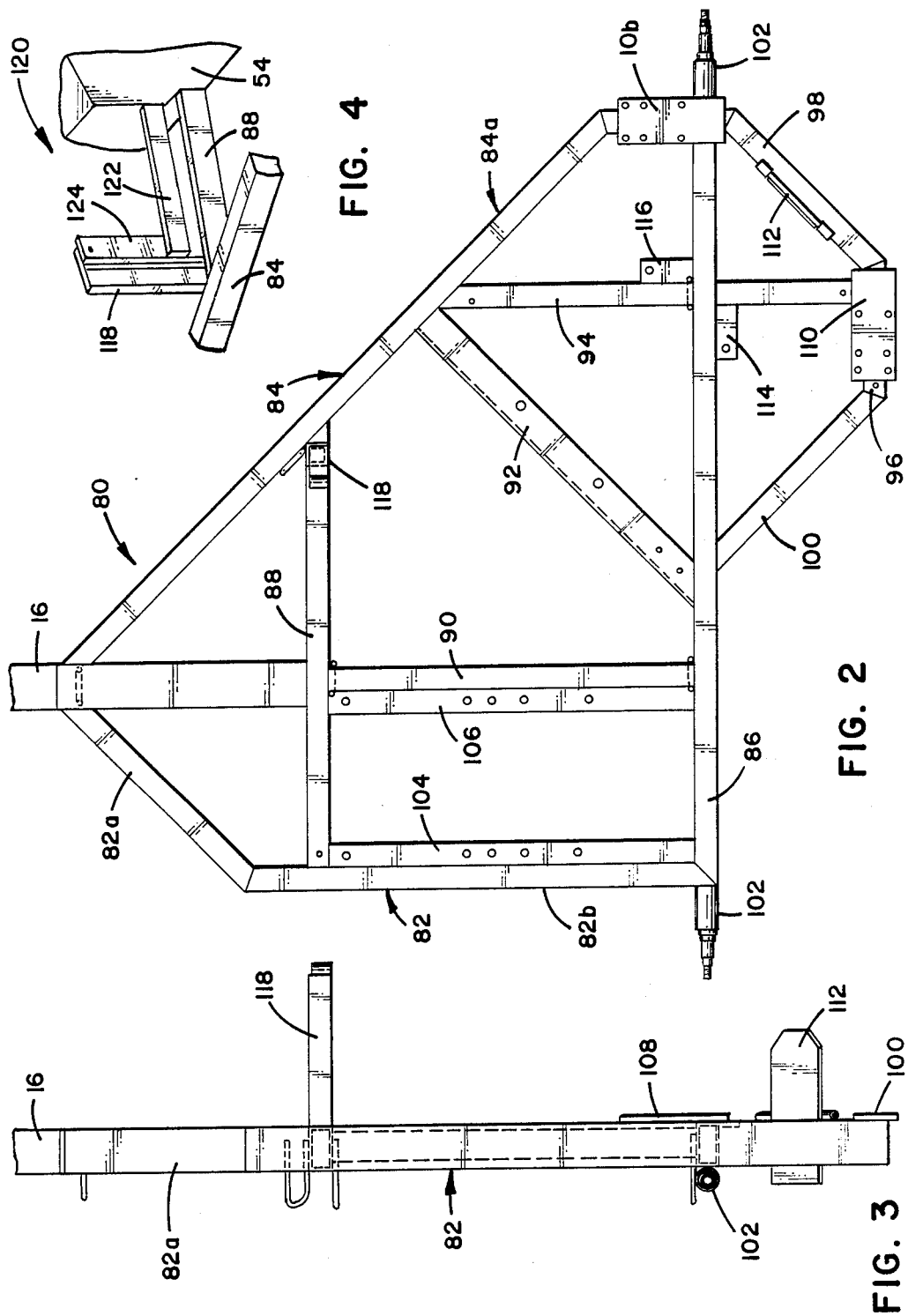

PNEUMATIC GRAIN CONVEYOR WITH UNIVERSAL FRAME

TECHNICAL FIELD

The present invention relates generally to pneumatic grain conveyors, and more particularly to a universal frame for pneumatic grain conveyors which facilitates improved interchangeability and arrangement of components so that machines of different capacities can be constructed with the same frame.

BACKGROUND ART

Pneumatic conveyors are widely used today for transferring grain and other types of granular material. For example, such devices can be used for transferring grain from a storage silo to a delivery truck, a laborious and time-consuming task which was otherwise accomplished by shoveling. Such pneumatic conveyors generally include a cyclone separator having a tangential material inlet and a bottom axial material outlet. The suction side of a blower is connected to an axial air inlet in the top of the separator. The high pressure side of the blower in connected to a rotary valve which is connected between the material outlet of the separator and a discharge pipe connected to a line leading to the point of discharge. Such devices have been mounted for mobility and adapted for use with power take-off attachments on tractors to facilitate portability and use in unloading various silos on a farm, for example. In addition, the discharge pipes have been located at one of the corners of the frame for better access.

Pneumatic grain conveyors of this general type have been available for years under the name HANDLAIR from Christianson Systems, Inc. of Blomkest, Minn., the assignee hereof. See U.S. Pat. Nos. 4,433,946 and Des. 271,105.

Such pneumatic grain conveyors have been available in various capacities heretofore, but have required different frames depending upon the particular components involved. Thus, while some components were common between models of different capacities, separate frames were required which in turn increased inventory cost and manufacturing costs. Further, although the components of such pneumatic conveyors were generally arranged so that the material being conveyed could be discharged into an adjacent trailer or truck, they were not particularly arranged to facilitate maximum versatility and discharge over the widest possible area.

A need has thus arisen for a pneumatic grain conveyor having a universal frame which is interchangeable between models of different capacities having different components arranged to avoid unnecessary operational limitations for maximum versatility in discharging the grain into an adjacent truck or trailer.

SUMMARY OF INVENTION

The present invention comprises a pneumatic grain conveyor with improved frame which overcomes the foregoing and other difficulties associated with the prior art. In accordance with the invention, there is provided a pneumatic grain conveyor including a universal frame which is adapted for interchangeability between models of different capacities. The frame comprises a plurality of structural members arranged and interconnected so as to define a relatively small outside periphery which avoids unnecessary interference with the path of an adjacent truck or trailer for maximum versatility while discharging the material. The frame preferably includes an offset longitudinal tongue and hitch. Further, the frame is adapted to facilitate mounting of the pneumatic grain conveyor components in generally diagonal straight-line fashion so that the discharge pipe can be swung over a larger free, unobstructed area at a rear corner of the trailer.

BRIEF DESCRIPTION OF DRAWINGS

A better understanding of the invention can be had by reference to the following Detailed Description in conjunction with the accompanying Drawings, wherein:

FIG. 2 is a top view of the universal frame;

FIG. 3 is a side view of the universal frame; and

FIG. 4 is a partial perspective view of a portion of the frame.

DETAILED DESCRIPTION

Figure 1:
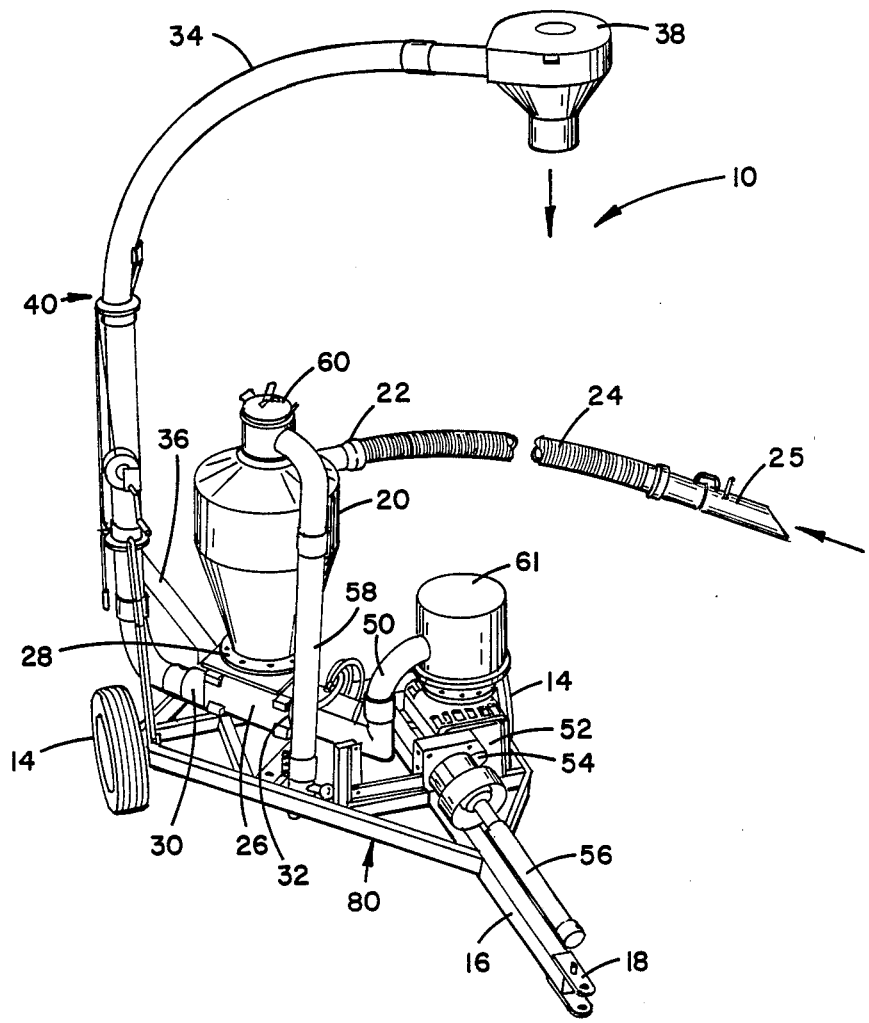
FIG. 1 is a perspective view of a pneumatic grain conveyor incorporating the universal frame of the invention.

Referring now to the Drawings, and particularly referring to FIG. 1, there is shown a pneumatic grain conveyor 10 incorporating a silencer of the present invention. The pneumatic grain conveyor 10 includes a frame 80 having a pair of spaced apart wheels 14 thereon for mobility. A tongue 16 is provided on the front of frame 80, and a hitch 18 is provided on the front of the tongue for selective connection to a tractor or other suitable tow vehicle. The tongue 16 is preferably longitudinally offset from the center line of frame 80 for improved clearance when loading trucks or trailers, as will be explained more fully hereinafter.

A cyclone separator 20 is mounted on frame 80. The separator 20 includes a housing having a generally cylindrical upper side wall and a generally conical truncated lower wall as shown. A tangential grain or material inlet 22 is provided in the generally cylindrical upper wall of the housing of separator 20. A pipe or hose 24, which can be either rigid, semi rigid, or flexible is connected to the material inlet 22 and extends to a nozzle 25 for picking up the material to be conveyed. For example, the hose 24 would typically extend into a bin or silo for removing grain or the like therefrom.

A rotary air lock conveying valve 26 of the flow-through type is secured to the material outlet 28 in the conical truncated lower portion of the housing of separator 20. The valve 26 includes a material inlet coupled directly to the material outlet 28 of separator 20, a material outlet 30, and an air inlet 32. The valve 26 is typically hydraulically driven. A suitable valve is commercially available from Semco. The material outlet 30 is connected to a discharge pipe 34 which extends upwardly and is supported by an upright 36 on the rear corner of frame 80. A discharge cyclone 38 is provided on the end of pipe 34 for breaking the air lock and assuring that the grain or other material falls gently into an underlying trailer or truck (not shown).

The discharge pipe 34 is preferably of split construction to reduce clearance during transport of the pneumatic grain conveyor 10 between sites. In particular, the discharge pipe 34 includes a pivotal upper portion and a fixed lower portion interconnected by a coupling 40 like that shown in U.S. Pat. No. 4,433,946, the disclosure of which is hereby incorporated by reference. The upper portion of discharge pipe 34 folds between raised and lowered positions responsive to a crank or hydraulic cylinder arrangement.

The air inlet 32 of rotary valve 26 is connected by pipe 50 to the outlet of a blower 52, which is driven through a gear box 54 by a shaft 56 connected to the power takeoff (PTO) attachment of a tractor (not shown). For example, the RCS 409 or RCS 412 blower from Roots division of Dresser Industries, Inc. can be used for the blower 52, which typically operates at about 700–16000 CFM and 5–8 psi. The inlet of blower 52 is connected by pipe 58 to a filter assembly 60 mounted axially in the top end of separator 20.

The blower 52 is a positive displacement air pump which draws air from the separator 20 in order to lower the pressure therein, and thus effect suction on the material inlet 24 such that the grain or other material to be conveyed is drawn inwardly thus creating a vortex within the separator. The resulting centrifugal force causes the grain to move outwardly within the separator 20 as it swirls downwardly by gravity through the material outlet 28 and into valve 26, from which it is forced by the pressurized air from blower 52 through the discharge pipe 34. The swirling action within separator 20 results in separation of chaff, dust and other foreign material from the grain which is entrained in the air and carried through the filter assembly 60 and pipe 58 to blower 52 for pressurization. Although filter assembly 60 is used, it will be appreciated that air containing a fair amount of dust and foreign material enters the blower 52.

If desired, a noise suppressor or silencer 70 can be connected between valve 26 and blower 52.

Referring now to FIGS. 2 and 3 in conjunction with FIG. 1, there is shown the universal frame 80 of the invention. The frame 80 is comprises of structural members arranged and interconnected into a rigid structure. In particular, the frame 80 includes a pair of side members 82 and 84, and a transverse rear member 86. The side member 82 includes a front diagonal portion 82a connected to tongue 16 and a rear longitudinal portion 82b connected to the transverse rear member 86. The side member 84 includes a relatively longer front diagonal portion 84a and a relatively shorter longitudinal 84b. An intermediate transverse member 88 interconnects the side members 82 and 84 and the rear end of tongue 16. A longitudinal member 90, which is preferably in line with the tongue 16 or an integral extension thereof, interconnects members 86 and 88. Members 92 and 94 are connected between the rear transverse member 86 and the side member 84 in the fashion of a truss as shown.

The offset longitudinal intermediate member 94 extends beyond the rear transverse member 86, and is connected with an end member 96. The end member 96 in turn is interconnected by diagonal end members 98 and 100 to side member 84 and rear transverse member 86 as shown to define a projecting platform at the rear corner of frame 80 opposite from the offset tongue 16 and hitch 18. This permits access to the discharge pipe 34 over an arc of 90° to 120°.

Stub axles 102 are secured to opposite ends of the rear transverse member 86 for rotatably mounting wheels 14.

Various mounting plates are also provided on frame 80 for supporting the components of the pneumatic grain conveyor 10. The blower 52 is mounted on plates 104 and 106 secured to side member 82 and intermediate longitudinal member 90, respectively. Angle irons can be used for plates 104 and 106. The upright 36 is mounted on plates 108 and 110 on side member 84 and end member 96, respectively. A safety plate 112 is pivotally secured to diagonal end member 98 for signalling whether discharge pipe 34 is connected to the material outlet 30 of valve 26 for safety purposes; otherwise it rocks outwardly. The rotary valve 26 is mounted on plates 114 and 116 on members 86 and 94, and the diagonal intermediate frame member 92.

Referring now to FIGS. 1, 2 and 4, frame 80 also includes a post 118 on member 88 for supporting the torsion arm 120 connected between the gearbox 54 and frame. The torsion arm 120 includes a rigid lateral bar 122 and a less rigid, semi-flexible supporting strap 124 pivoted at its upper end to post 118 to allow some axial movement between blower 52, gearbox 54 and drive shaft 56.

From the foregoing, it will thus be apparent that the present invention comprises a pneumatic grain conveyor with universal frame having numerous advantages over the prior art. The frame herein is adapted for improved versatility to avoid the need for models of different capacities, and is further arranged to present an outer periphery of minimal size so that the components can be arranged in generally diagonal fashion thereon for maximum versatility in discharging the material into an adjacent trailer or truck. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A pneumatic grain convector, comprising:
   a frame;
   hitch means including an offset longitudinal tongue for selectively connecting said frame to a tow vehicle;
   said frame including spaced-apart side members, each side member having a diagonal front portion secured to the tongue and a longitudinal rear portion secured to a transverse rear end member;
   the diagonal front and longitudinal rear portions of the side member of said frame closest to the tongue being relatively shorter and longer, respectively, than the front and rear portions of the other side member of said frame;
   a pair of wheels mounted in laterally spaced-apart relationship on said frame for mobility;
   a cyclone separator mounted on said frame, said separator including a closed housing with a top end wall having an air outlet therein, a generally cylindrical upper side wall having a tangential material inlet therein, and a generally conical truncated lower side wall having a material outlet at the bottom end thereof;
   rotary valve means including a material inlet connected to the material outlet of said cyclone separator, a material outlet, and an air inlet;
   blower means including an air inlet connected to the air outlet of said cyclone separator, and an air outlet connected to the air inlet of said rotary valve means; and
   means for driving said blower means.

2. The pneumatic grain conveyor of claim 1, wherein said frame further includes:
means including rear end members secured to said rear transverse member and to said other side member to define a projecting mounting platform opposite the tongue of said hitch means.

3. The pneumatic grain conveyor of claim 1, further including:
a filter assembly mounted in the air outlet of said cyclone separator.

4. The pneumatic grain conveyor of claim 1, further including:
a silencer connected between the air outlet of said blower means and the air inlet of said rotary valve means.

5. The pneumatic grain conveyor of claim 1, wherein said driving means includes a gear box, and further including:
an upright post secured to said frame; and
a torsion arm connected between said post and the gear box.

6. A universal frame for a pneumatic grain conveyor, which comprises:
a pair of spaced-apart side members, each of which includes a diagonal front portion and a longitudinal rear portion, the diagonal front portion of one side member being relatively shorter than that of the other side member and the longitudinal rear portion of said one side member being relatively longer than that of the other said side member;
an offset longitudinal tongue secured to the front diagonal portions of said side members;
hitch means for releaseably connecting said tongue to a tow vehicle;
a transverse rear member interconnecting the rear longitudinal portions of said side members; and
means including rear end members secured to said transverse rear member and said other side member to define a projecting mounting platform opposite said offset longitudinal tongue.

7. The universal frame of claim 6, wherein said tongue is also secured to said rear member.

8. The universal frame of claim 6, further including:
a transverse intermediate member interconnecting the diagonal front portion of one side member and the rear portion of the other side member.

9. The universal frame according to claim 8, wherein said tongue is also secured to said transverse intermediate member.

10. The universal frame of claim 6, further including:
stub axles projecting from opposite ends of said transverse rear member.

11. A universal frame for a pneumatic grain conveyor, comprising:
a pair of spaced-apart side members, each of which includes a diagonal front portion and a longitudinal rear portion, the diagonal front portion of one side member being relatively longer than that of the other side member and the longitudinal area portion of said one side member being relatively longer than that of the other said side member;
a transverse rear member interconnecting the longitudinal rear portions of said side members;
a transverse intermediate member interconnecting the front portion of said one side member and the rear portion of said other side member;
an offset longitudinal tongue interconnecting the front portions of said side members, said transverse intermediate member, and said transverse rear member;
hitch means for releaseably connecting said tongue to a tow vehicle;
means secured to opposite ends of said rear transverse member for rotateably supporting wheels thereon; and
means including rear end members secured to said transverse rear member and said other side member to define a projecting mounting platform opposite said offset longitudinal tongue.

* * * * *

UNITED STATES PATENT AND TRADEMARK OFFICE
CERTIFICATE OF CORRECTION

PATENT NO. : 4,846,605

DATED : July 11, 1989

INVENTOR(S) : Roy Christianson, Frank Christianson

It is certified that error appears in the above-identified patent and that said Letters Patent is hereby corrected as shown below:

On line 4 of the Abstract, delete "in" and insert --and--.

In Column 1, line 24, delete "in" and insert --is--.

In Column 3, line 35, delete "comprises" and insert --comprised--.

In Column 4, line 38, delete "convector" and insert --conveyor--.

In Column 6, line 19, delete "area" and insert --rear--.

In Column 6, line 34, delete "rotateably" and insert --rotatably--.

Signed and Sealed this

First Day of September, 1992

Attest:

DOUGLAS B. COMER

*Attesting Officer*      *Acting Commissioner of Patents and Trademarks*